Feb. 1, 1966     L. E. MILLER     3,233,077
PREHEATER FOR AIRPLANE ENGINES
Filed Feb. 18, 1963     2 Sheets-Sheet 1

INVENTOR.
LAWRENCE E. MILLER
BY
ATTORNEYS

Feb. 1, 1966 L. E. MILLER 3,233,077
PREHEATER FOR AIRPLANE ENGINES
Filed Feb. 18, 1963 2 Sheets-Sheet 2

INVENTOR.
LAWRENCE E. MILLER
BY
ATTORNEYS

United States Patent Office

3,233,077
Patented Feb. 1, 1966

3,233,077
PREHEATER FOR AIRPLANE ENGINES
Lawrence E. Miller, 2814 Dawes Road,
Roosevelt Park, Mich.
Filed Feb. 18, 1963, Ser. No. 259,232
1 Claim. (Cl. 219—205)

This invention relates to an engine preheater for cold weather, and more particularly to a preheater for airplane engines.

In cold fall and winter months, heavy weight oil used in air-cooled airplane engines becomes very viscous when the engine is not operating. Consequently, starting the high compression engine in cold weather requires a great deal of torque power due to initial lack of effective lubrication on sliding metal parts and to resistance of the viscous oil to movement of the crankshaft and connecting rods. This not only rapidly drains the power source, but also accelerates engine wear—a crucial factor in aircraft. Further, in sub-zero temperatures, engine starting sometimes is impossible without extensive preparation. Keeping the craft in a heated hanger is usually not convenient, possible or economical. Yet this has been the only practical method of overcoming the cold engine problem in winter weather heretofore.

It is therefore the primary object of this invention to provide an inexpensive, lightweight, preheater attachable to an airplane engine by one person in less than a minute, and capable of preheating the engine in a few minutes to a temperature enabling quick, easy starting even in the coldest weather. The novel engine preheater utilizes the engine cowling and the propeller to support it for quick attachment and removal. It is especially adaptable to private planes having opposed multiple cylinder engines, but is also readily adaptable to radial type engines. The cylinders are heated rapidly and simultaneously. The heater is adjustable to accommodate various size engines without requiring any tools. The unit is efficient and effective. It is controllable in the proportion of convection heat to radiation heat output to suit the particular ambient air temperature, for optimum heating. It fills a definite gap which has long existed in the field. It supplies a greatly needed aid to airplane owners and operators. The novel structure employs known principles of physics, yet in a unique and clever manner, achieving an entirely new result to solve a definite problem in a novel manner.

These and several other objects and advantages of this invention will be readily apparent to those familiar with the field upon studying the following specification in conjunction with the drawings in which.

Basically, the airplane engine preheater comprises a housing means including a pair of spaced housings, each having a heating bulb oriented toward an open end of the housing, and an air propulsion fan positioned to propel air from an adjustable air inlet, past the bulb, and out the open end. The air inlet adjustment enables variation of the ratio of convection heat output to radiant heat output. The two housings have variable spacing bracket means connecting them, preferably on a pivotal axis allowing the two open outlet ends to be spaced varying amounts with respect to each other to fit different size engines. Suspension means connects the preheater to a propeller blade when inserted in the engine cowling while baffle means radiating from the housing adjacent the outlet end close off the engine cowling opening during heating.

Figure 2:
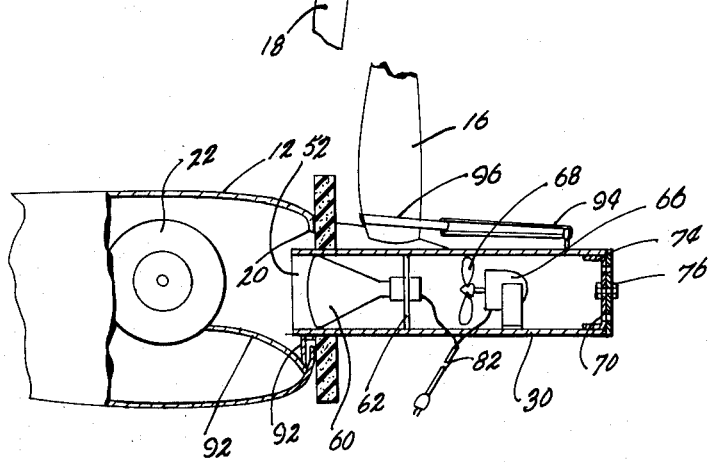
FIG. 2 is a side elevational, sectional view of the engine and preheater in FIG. 1.

Specifically, referring to the drawings, the novel air plane engine preheater 10 is shown attached to the cowling 12 of an airplane engine having two horizontally opposed cylinders. Projecting from the front of cowling 12 is a conventional prop hub 14 with prop blades 16 and 18. On opposite lateral sides of hub 14 are a pair of respective air inlet areas 20 (FIG. 2) to admit air to the cooling fins 22 of the respective opposed cylinders of the engine.

Figure 1:
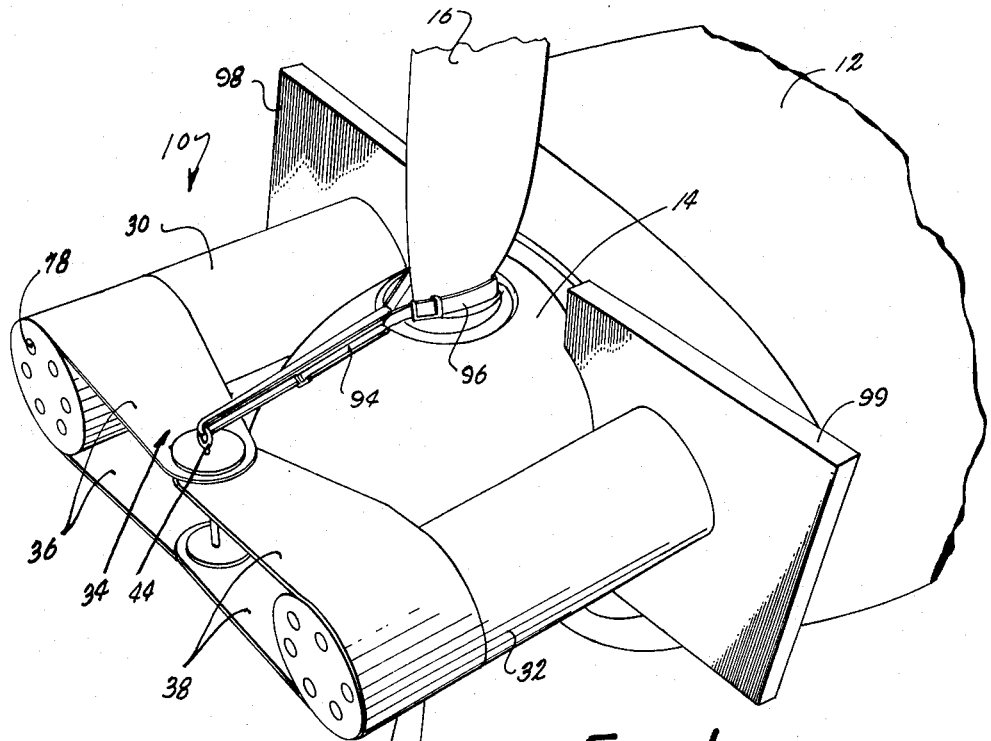
FIG. 1 is a perspective view of an airplane engine utilizing the novel preheater.
Figure 3:
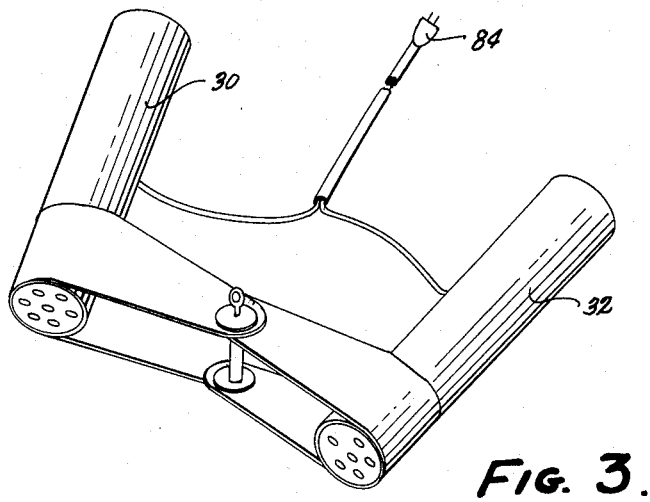
FIG. 3 is a perspective view of the preheater in an expanded condition showing its adjustability to larger engines.
Figure 4:
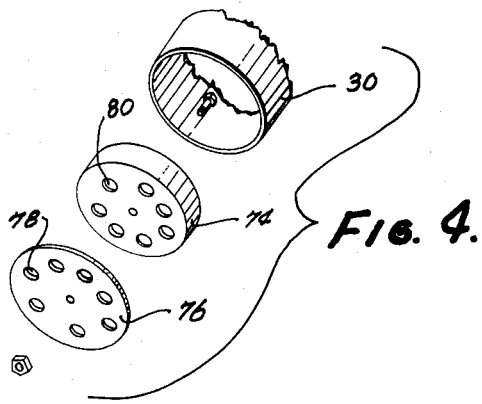
FIG. 4 is a fragmentary, exploded, perspective view of the air inlet regulator on each housing segment.
Figure 5:
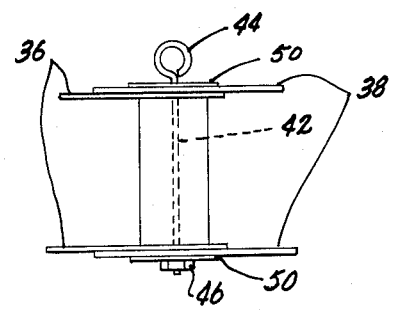
FIG. 5 is a fragmentary, elevational view of the pivotal adjustable connecting means between the two sections of the housing.

The preheater 10 includes a pair of housing sections 30 and 32 interconnected by bracket means 34. The housings may be made from sheet metal conduit, while the bracket means may be formed of a pair of sheet metal arms 36 projecting from housing 30, and a cooperating second pair of sheet metal arms 38 projecting from housing 32. Each pair of arms is formed by bending a continuous piece of sheet metal around the outer end of the housing and attaching it to the housing by suitable means such as riveting. A cylindrical spacer 40 is placed between the arms 36 and 38 when assembled. The entire assembly is pivotally connected by a stud 42. The stud has an eye 44 on its upper end and a nut 46 threadably secured on the lower end. Suitable washers 50 are employed. The two housings may be adjusted with respect to each other about this pivotal axis. This adjusts the open ends 52 of the housings with respect to each other as shown for example by comparison of FIGS. 1 and 3. This enables the structure to fit various size engines with different spacing between the pair of air intakes.

Inside each housing is a heat bulb 60 mounted on radial legs 62 to the interior walls of the respective housing. Each bulb is oriented axially toward the open end 52 of its housing to radiate heat directly onto fins 22 of the respective engine cylinders.

Also mounted in each of the housings is a fan having an electrical motor 66 operably connected to a fan blade 68. The fan draws air into the air inlets 70 at the opposite end of the housing from outlet 52, propels it through the passage area around bulb 60, and out outlet 52 to create convection heating in the area of the cylinder fins. Thus, cool incoming air is heated as it passes bulb 60 and in turn heats the engine. This supplements the radiant heating directly from bulb 60.

In very cold ambient temperatures, the amount of air introduced into the housing should be decreased since the cold air could not be heated sufficiently, causing the fan to blow cool rather than hot air into the engine cowling. To prevent this and generally provide control of this variable, the air inlet 70 is adjustable to allow different air flow. This is achieved by a valving means formed by the internal cap or plug 74 secured inside the outer end of each housing and the rotatable plate 76 attached thereto. The attachment is by suitable connecting means such as a bolt and nut connection to allow rotation of plate 76. The orifices 78 in plate 76 can be made to coincide varying amounts with orifices 80 in cap 74 to regulate the air inlet over a wide range. Electrical lead connections may be made from the bulb and fan in each housing to an external outlet using a common lead 82 (FIG. 2), and a common plug 84. Obviously, many other equivalent connections could be used.

To attach the preheater to the engine, the open ends of the housings are placed into the respective engine air inlets on opposite sides of hub 14. Usually the lower edge of the housing is placed against the conventional air directing baffle 90 inside the engine cowling. In some engines which have debris screens in the air inlets, the lower open ends cannot protrude far enough into the cowling to provide a stable attachment. In these cases, a small hook 92 is attached to the bottom of the open end of each housing to hook over the upwardly protruding flange on the lower part of the cowling and against the screen or the baffle 90. One hook is provided on each of the housings 30 and 32. The rear end of the preheater is suspended from the propeller blade by connecting strap means which may include a pair of suitable straps 94 and 96 inserted through the eye 44 and around the base of the propeller blade 16 manually rotated to a vertical position. Preferably, a pair of baffles 98 and 99, which may be a foam plastic or foam rubber or any suitable material, are placed around the housings. These radiate adjacent the open end of the housings to close up the peripheral area of the engine cowling inlet so that the air blown in from the preheater will have optimum effect. The engine air inlet openings around the heater housing elements may alternatively be closed by canvas or other suitable covering material.

OPERATION

To heat up a cold engine to start it, the preheater is manually attached several minutes before take-off time. This is done readily by lifting it in position and spreading or contracting the open ends of housings 30 and 32 until they coincide with the cowling air inlets on the particular airplane engine involved. They are then inserted a small distance into the cowling to support the forward end, and hooks 92 are secured over the cowling flange. Next, the straps 94 and 96 are connected around the prop which has been positioned vertically for support. The baffles 98 and 99 are pushed snugly up against the cowling and the unit is then ready for operation. This atttachment can be simply done in a couple of minutes by one person. The entire assembly weighs only a few pounds. The plug 84 is then connected to a suitable electrical outlet to activate both the infrared bulbs and both fans in the housings. The heat bulbs radiate heat directly onto the cooling fins of the two respective cylinders. The fan draws air into the inlets 70, blows it around the hot bulbs 60 to heat it, and propels it out outlets 52 into contact with the cooling fins to warm the engine by convection and conduction. If the outside or ambient air temperature is very cold, the valving plate 76 is rotated to partially close the respective air inlets controlled amounts so that the air passing the bulb can be heated to an optimum temperature, and will not be cool yet as it passes into the engine. After the unit has been operating for several minutes, depending upon the outside temperature and thus the amount of heat necessary to bring it to a starting temperature, the unit is simply removed by disconnecting the straps and lifting it away from the engine. Since the unit is made up of chiefly simple sheet metal conduit components, it is lightweight and can be readily lifted into position and removed with complete ease by one person. It is completely portable. The heat output is large.

Those having ordinary skill in the art, after studying the foregoing principles and the preferred form of the invention illustrated, will envision certain obvious changes in the structure to suit a particular situation or type of engine. These obvious modifications, which employ the principles of the inventive structure taught, are deemed to be part of this invention, which is to be limited only by the scope of the appended claim and the reasonably equivalent structures to those defined therein.

I claim:

A preheater for multiple opposed cylinder propeller type airplane engines having a cowling comprising: a pair of spaced tubular elongated housings arranged side by side, each having an open air outlet end; adjustable bracket means connecting said housings, including pivotal connection means enabling angular adjustment of the housings with respect to each other for variable spacing of said outlet ends thereof for adaption to variable spaced cowling inlets to the engine; each of said housings having a heat bulb mounted therein and directed out said open end thereof to radiate heat unto the engine; each of said housings also including fan means to propel air past said bulb and out said open end to the engine; the open end of said housings adapted to be supported on the cowling adjacent said engine; said bracket means being attached to the ends of said elongated housings opposite said open end and flexible suspension means to support said opposite ends of said housings; baffle means around each of said housings adjacent said open ends and radiating therefrom to close off the peripheral air inlet area to said engine cowling; and variable air inlet means to each of said housings to make optimum use of radiant heat and convection-conduction heat depending upon ambient temperature conditions.

References Cited by the Examiner

UNITED STATES PATENTS

| | | | |
|---|---|---|---|
| 939,106 | 11/1909 | Soles | 219—377 |
| 1,436,060 | 11/1922 | Strong | 219—208 X |
| 1,534,220 | 4/1925 | Kercher | 219—208 |
| 1,872,078 | 8/1932 | Giambertoni | 219—362 X |
| 2,015,982 | 10/1935 | Witzel | 219—374 X |
| 2,096,023 | 10/1937 | Albertson | 219—370 X |
| 2,284,653 | 6/1942 | Hackethal | 219—369 X |
| 2,456,881 | 12/1948 | Leather | 219—366 |
| 2,515,659 | 7/1950 | Michal | 219—358 |
| 2,792,488 | 5/1957 | Giza | 219—377 |

FOREIGN PATENTS

| | | |
|---|---|---|
| 364,275 | 11/1922 | Germany. |
| 326,841 | 3/1930 | Great Britain. |

ANTHONY BARTIS, *Acting Primary Examiner.*

RICHARD M. WOOD, *Examiner.*